(12) United States Patent
Mazzola et al.

(10) Patent No.: US 7,534,086 B2
(45) Date of Patent: May 19, 2009

(54) MULTI-LAYER RING SEAL

(75) Inventors: Stefan Mazzola, Sanford, FL (US);
Douglas A. Keller, Oviedo, FL (US);
Anthony L. Schiavo, Oviedo, FL (US);
David C. Radonovich, Winter Park, FL (US)

(73) Assignee: Siemens Energy, Inc., Orlando, FL (US)

( * ) Notice: Subject to any disclaimer, the term of this patent is extended or adjusted under 35 U.S.C. 154(b) by 477 days.

(21) Appl. No.: 11/418,863

(22) Filed: May 5, 2006

(65) Prior Publication Data

US 2007/0258809 A1 Nov. 8, 2007

(51) Int. Cl.
*F01D 11/08* (2006.01)
(52) U.S. Cl. .................................... 415/173.1
(58) Field of Classification Search .................. None
See application file for complete search history.

(56) References Cited

U.S. PATENT DOCUMENTS

| | | | |
|---|---|---|---|
| 3,844,727 A | 10/1974 | Copley et al. | |
| 5,988,975 A * | 11/1999 | Pizzi | 415/173.1 |
| 6,102,656 A | 8/2000 | Nissley et al. | |
| 6,197,424 B1 | 3/2001 | Morrison et al. | |
| 6,235,370 B1 | 5/2001 | Merrill et al. | |
| 6,306,515 B1 | 10/2001 | Goedjen et al. | |
| 6,387,526 B1 | 5/2002 | Beele | |
| 6,541,134 B1 | 4/2003 | Strangman et al. | |
| 6,558,814 B2 | 5/2003 | Spitsberg et al. | |
| 6,670,046 B1 | 12/2003 | Xia | |
| 6,702,550 B2 | 3/2004 | Darkins, Jr. et al. | |
| 6,730,422 B2 | 5/2004 | Litton et al. | |
| 6,733,907 B2 | 5/2004 | Morrison et al. | |
| 6,733,908 B1 | 5/2004 | Lee et al. | |
| 2002/0132131 A1 | 9/2002 | Bossmann et al. | |
| 2003/0223861 A1 | 12/2003 | Morrison et al. | |
| 2004/0005216 A1 | 1/2004 | Suzumura et al. | |
| 2004/0028941 A1 | 2/2004 | Lane et al. | |
| 2004/0047726 A1 | 3/2004 | Morrison | |
| 2004/0058201 A1 * | 3/2004 | Merrill et al. | 428/702 |
| 2004/0219010 A1 | 11/2004 | Merrill et al. | |

* cited by examiner

Primary Examiner—Richard Edgar

(57) ABSTRACT

Aspects of the invention are directed to a multi-layer ring seal segment that can incorporate a plurality of material systems. The ring seal segment can include an inner layer, a central layer and an outer layer. The inner layer can be attached to one side of the central layer, and the outer layer can be attached to an opposite side of the central layer. The inner and outer layers can be made of a ceramic matrix composite, such as a hybrid oxide ceramic matrix composite or an oxide-oxide ceramic matrix composite. The central layer can be made of a material that has high shear strength relative to the inner and outer layers. The ring seal segment according to aspects of the invention can take advantage of the benefits of the different materials so as to better withstand the operational loads of the turbine.

19 Claims, 3 Drawing Sheets

MULTI-LAYER RING SEAL

FIELD OF THE INVENTION

Aspects of the invention relate in general to turbine engines and, more particularly, to ring seals in the turbine section of a turbine engine.

BACKGROUND OF THE INVENTION

FIG. 1 shows an example of one known turbine engine 10 having a compressor section 12, a combustor section 14 and a turbine section 16. In the turbine section 16 of a turbine engine, there are alternating rows of stationary airfoils 18 (commonly referred to as vanes) and rotating airfoils 20 (commonly referred to as blades). Each row of blades 20 is formed by a plurality of airfoils 20 attached to a disc 22 provided on a rotor 24. The blades 20 can extend radially outward from the discs 22 and terminate in a region known as the blade tip 26. Each row of vanes 18 is formed by attaching a plurality of vanes 18 to a vane carrier 28. The vanes 18 can extend radially inward from the inner peripheral surface 30 of the vane carrier 28. The vane carrier 28 is attached to an outer casing 32, which encloses the turbine section 16 of the engine 10.

Between the rows of vanes 18, a ring seal 34 can be attached to the inner peripheral surface 30 of the vane carrier 28. The ring seal 34 is a stationary component that acts as a hot gas path guide between the rows of vanes 18 at the locations of the rotating blades 20. The ring seal 34 is commonly formed by a plurality of metal ring segments. The ring segments can be attached either directly to the vane carrier 28 or indirectly such as by attaching to metal isolation rings (not shown) that attach to the vane carrier 28. Each ring seal 34 can substantially surround a row of blades 20 such that the tips 26 of the rotating blades 20 are in close proximity to the ring seal 34.

In operation, high temperature, high velocity gases generated in the combustor section 14 flow through the turbine section 16. The gases flow through the rows of vanes 18 and blades 20 in the turbine section 16. The ring seals 34 are exposed to these gases as well. The metal ring seals 34 must be cooled in order to withstand the high temperature. In many engine designs, demands to improve engine performance have been met in part by increasing engine firing temperatures. Consequently, the ring seals 34 require greater cooling to keep the temperature of the ring seals 34 within the critical metal temperature limit. In the past, the ring seals 34 have been coated with thermal barrier coatings to minimize the amount of cooling required. However, even with a thermal barrier coating, the ring seal 34 must still be actively cooled to prevent the ring seal 34 from overheating and burning up. Such active cooling systems are usually complicated and costly. Further, the use of greater amounts of air to cool the ring seals 34 detracts from the use of air for other purposes in the engine.

As an alternative, the ring seals 34 could be made of ceramic matrix composites (CMC), which have higher temperature capabilities than metal alloys. By utilizing such materials, cooling air can be reduced, which has a direct impact on engine performance, emissions control and operating economics. However, CMC materials have their own drawbacks. For instance, CMC materials (oxide and non-oxide based) have anisotropic strength properties. The interlaminar tensile strength (the "through thickness" tensile strength) can be less than five percent of the in-plane strength. In addition, anisotropic shrinkage of the matrix and the fibers can result in de-lamination defects, particularly in small radius corners and tightly-curved sections, which can further reduce the interlaminar tensile strength of the material.

Thus, there is a need for a ring seal construction that can take advantage of the benefits of more than one material system.

SUMMARY OF THE INVENTION

Aspects of the invention are directed to a turbine engine ring seal. The ring seal includes a ring seal body that has a radially inwardly concave surface. The ring seal body is shaped so as to form an extension transitioning in a first region into a forward span and in a second region into an aft span. The first and second spans are opposite each other and extend at an angle from the extension in a radially outward direction.

The ring seal body has a first layer and a second layer. The second layer has an inner surface and an outer surface. The first layer is attached to one of the inner surface and the outer surface of the second layer. The first layer can include an outer surface and an inner surface. In one embodiment, the outer surface of the first layer can be attached to the inner surface of the second layer. In such case, at least a portion of the inner surface of the first layer can be coated with a thermal insulating material.

The first layer is made of a ceramic matrix composite. In one embodiment, the first layer can be made of a hybrid oxide ceramic matrix composite. Alternatively, the first layer can be made of an oxide-oxide ceramic matrix composite. The second layer is made of a non-ceramic matrix composite material. For instance, the second layer can be made of a strain tolerant aggregate material, friable graded insulation, or a monolithic ceramic.

The first layer can include a ceramic matrix with a plurality of fibers therein. A substantial portion of the fibers, at least in the extension of the ring seal body, can be oriented so as to extend along the first layer in a direction from the first region to the second region. The first layer can have an associated first thickness, and the second layer can have an associated second thickness. The second thickness can be greater than the first thickness.

In one embodiment, the ring seal body can have a third layer made of a ceramic matrix composite, which can be different than the ceramic matrix composite of the first layer. The third layer can be attached to the other one of the inner surface and the outer surface of the second layer.

A seal can be operatively associated with the ring seal body. The ring seal body can include a first circumferential end and a second circumferential end. One or both of the first and second circumferential ends can include a channel therein. At least a portion of the seal can be received within the channel.

Another turbine engine ring seal according to aspects of the invention includes a ring seal body that has a radially inwardly concave surface. The ring seal body is shaped so as to form an extension transitioning in a first region into a forward span and in a second region into an aft span. The first and second spans are opposite each other and extend at an angle from the extension in a radially outward direction.

The ring seal body has an inner layer, a central layer and an outer layer. The central layer has an inner surface and an outer surface. The inner layer is attached to the inner surface of the central layer, and the outer layer is attached to the outer surface of the central layer.

The inner layer is made of a first ceramic matrix composite. Likewise, the outer layer is made of a second ceramic matrix composite. The inner layer and/or the outer layer can be made of a hybrid oxide ceramic matrix composite. Alternatively, the inner layer and/or the outer layer can be made of an oxide-oxide ceramic matrix composite. The first ceramic matrix composite can be the same as the second ceramic matrix composite. However, the first ceramic matrix composite and the second ceramic matrix composite can be different. At least a portion of the inner layer can be coated with a thermal insulating material.

The inner layer can include a ceramic matrix with a first plurality of fibers therein, and the outer layer can include a ceramic matrix with a second plurality of fibers therein. A substantial portion of the fibers in each of the first and second plurality of fibers, at least in the extension of the ring seal body, can be oriented so as to extend along the inner and outer layers in a direction from the first region to the second region.

The central layer is made of a material that is different from each of the first and second ceramic matrix composites. For example, the central layer can be made of a strain tolerant aggregate material, friable graded insulation, or a monolithic ceramic. The central layer can have an associated thickness. Likewise, each of the inner and outer layers can have an associated thickness. The thickness of the central layer can be greater than the thickness of the inner layer and the thickness of the outer layer A seal can be operatively associated with the ring seal body. The ring seal body can include a first circumferential end and a second circumferential end. One or both of the first and second circumferential ends can include a channel therein. At least a portion of the seal can be received within the channel.

DETAILED DESCRIPTION OF EMBODIMENTS OF THE INVENTION

Embodiments of the invention are directed to a construction that can allow multiple material systems to be used in a ring seal or a ring seal segment for a turbine engine. Aspects of the invention will be explained in connection with one possible ring seal segment, but the detailed description is intended only as exemplary. An embodiment of the invention is shown in FIGS. 2-3, but the present invention is not limited to the illustrated structure or application.

Figure 1:
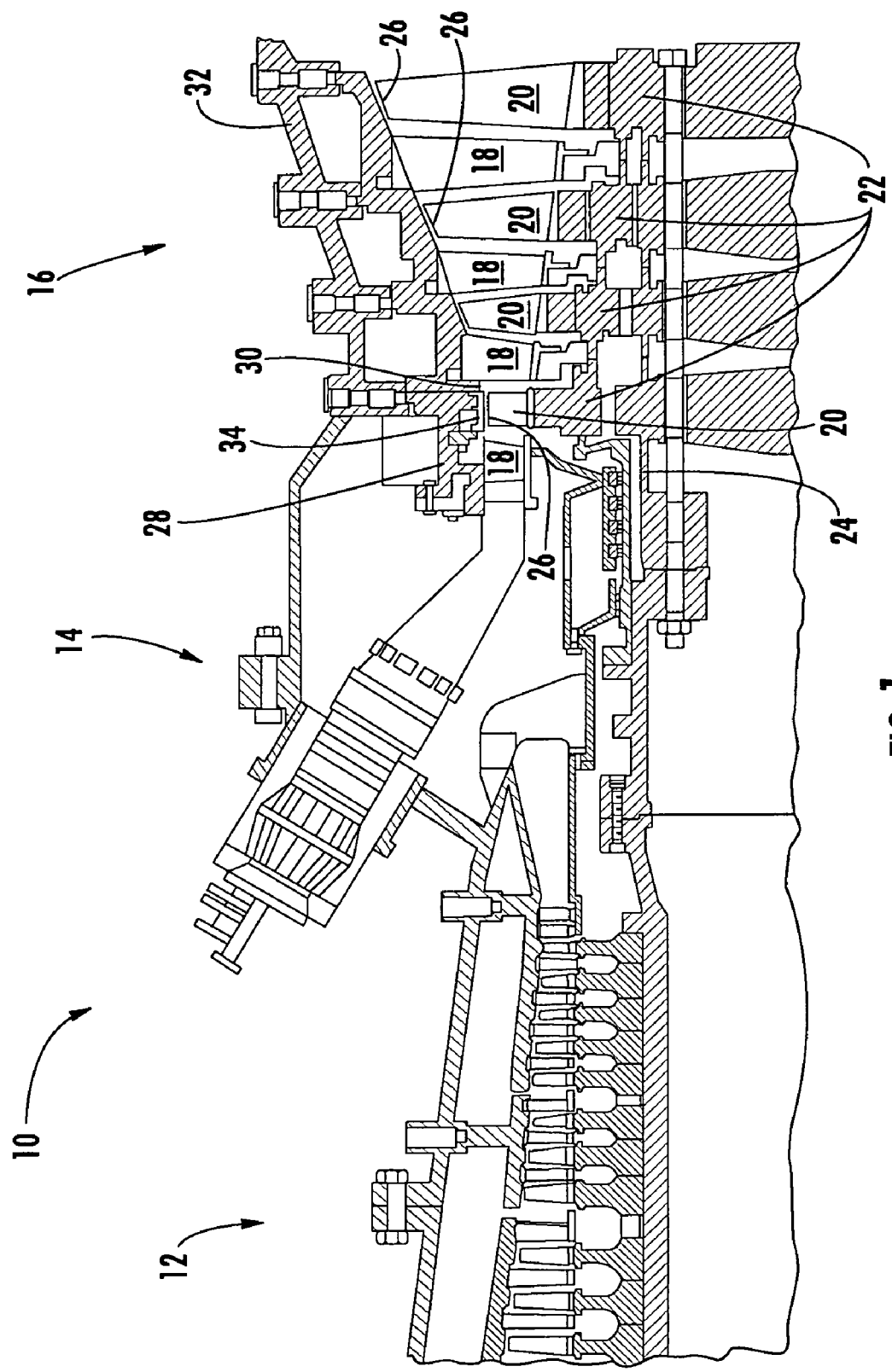
FIG. 1 is a cross-sectional view of the turbine section of a known turbine engine.
Figure 2:
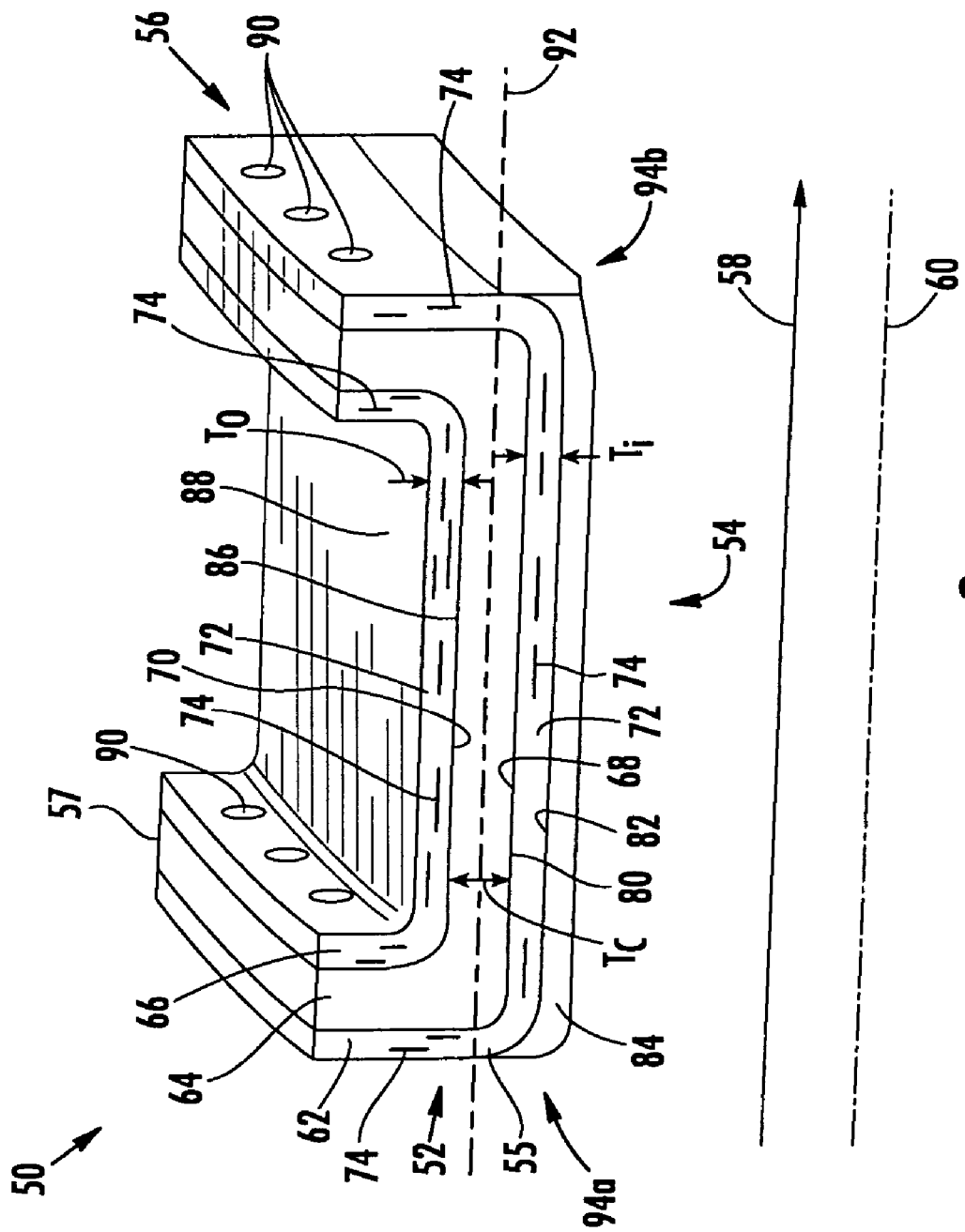
FIG. 2 is an isometric view of a ring seal segment according to aspects of the invention.
Figure 3:
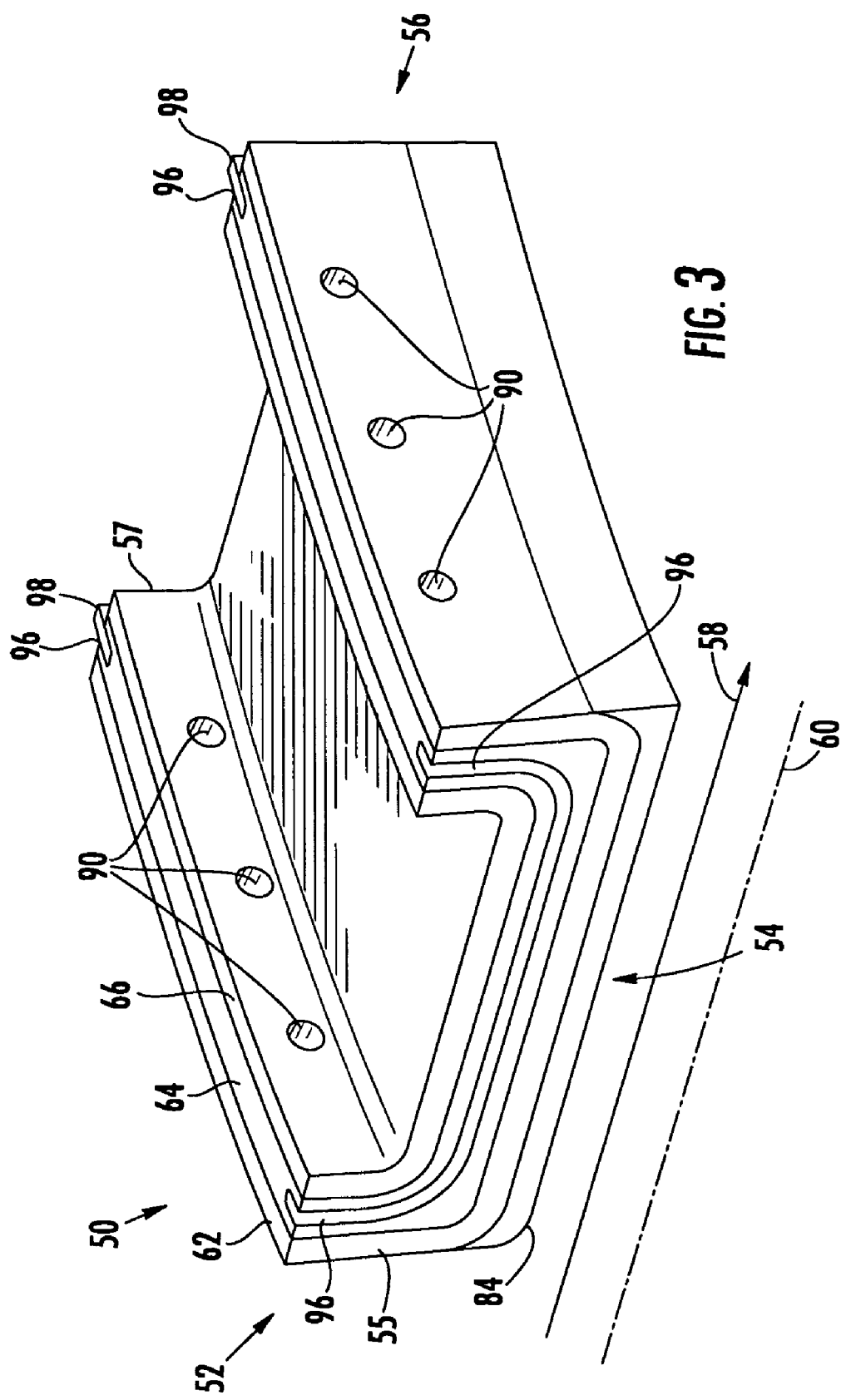
FIG. 3 is an isometric view of a ring seal segment according to aspects of the invention, wherein the ring seal segment is adapted to receive at least a portion of a seal.

FIG. 2 shows a ring seal body according to aspects of the invention. The ring seal body can be, for example, a ring seal segment 50. The ring seal segment 50 has a forward span 52, an extension 54 and an aft span 56. The extension 54 transitions into the forward span 52 in a first region 94a; the extension 54 transitions into the aft span 56 in a second region 94b that is opposite the first region 94a. The terms "forward" and "aft" are intended to mean relative to the direction of the gas flow 58 through the turbine section when the ring seal segment 50 is installed in its operational position.

The forward span 52 and the aft span 56 can extend at an angle from the extension in a radially outward direction. The term "radially outward direction" is intended to mean generally in the radially outward direction; that is, the spans 52, 56 can extend in a direction that has a radially outward component. In one embodiment, the forward and aft spans 52, 56 can extend at substantially 90 degrees from the extension 54 (i.e., along a radial line). Thus, when the ring seal segment 50 is in its operational position, the forward and aft spans 52, 56 can extend substantially radially outward relative to the axis of the turbine 60. The spans 52, 56 can extend at angles greater than or less than 90 degrees to thus form an acute or obtuse angle relative to the extension 54. The forward and aft spans 52, 56 can extend at the same angle or at different angles relative to the extension 54.

The ring seal segment 50 can have a first circumferential end 55 and a second circumferential end 57. The term "circumferential" is intended to mean relative to the turbine axis 60 when the ring seal segment 50 is installed in its operational position. The ring seal segment 50 can be curved circumferentially as it extends from the first circumferential end 55 to the second circumferential end 57. In such case, a plurality of the ring seal segments 50 can be installed so that each of the circumferential ends 55, 57 of a ring seal segment 50 is adjacent to one of the circumferential ends of a neighboring ring seal segment so as to collectively form an annular ring seal.

The ring seal segment 50 can be made of a plurality of layers. In one embodiment, the ring seal segment 50 can have at least three layers. For convenience, these layers will be referred to herein as an inner layer 62, a central layer 64 and an outer layer 66, respectively. Use of the terms "inner" and "outer" herein is intended to refer to the operational position of these layers relative to the axis of the turbine 60. Each of the inner layer 62 and the outer layer 66 can be attached to the central layer 64. Each of the layers will be discussed in turn below.

The central layer 64 can have an inner surface 68 and an outer surface 70. The central layer 64 can have an associated thickness $T_c$. In one embodiment, the thickness $T_c$ of the central layer 64 can be substantially uniform. In other embodiments, the thickness $T_c$ of the central layer 64 can vary. The central layer 64 can be made of a material that can provide sufficient strength to the ring seal segment 50 and that can accommodate a substantial portion of the shear loads that can develop during engine operation due to the differential pressure load across the ring segment. A preferred material for the central layer 64 would have at least the following properties: (a) high shear strength relative to the shear strength of the inner and outer layers 62, 66; (b) good bond strength with the material of the inner and outer layers 62, 66; (c) a coefficient of thermal expansion that is closely matched with the coefficient of thermal expansion with both the inner and outer layers to reduce thermal stress; and (d) sufficient thermal conductivity to allow proper cooling.

However, the central layer 64 can be made of a material that does not possess all of these qualities. For instance, the central layer 64 can be made of a strain tolerant aggregate material, such as the material disclosed in U.S. Patent Application Publication No. 2004/0043889, which is incorporated herein by reference. Alternatively, the central layer can be made of friable graded insulation (FGI). Various examples of FGI are disclosed in U.S. Pat. Nos. 6,676,783; 6,670,046; 6,641,907; 6,287,511; 6,235,370; and 6,013,592, which are incorporated herein by reference. In yet another embodiment, the central layer can be made of a monolithic ceramic, such as AN-191, which is available from Saint-Gobain, Worcester, Mass.

The inner and outer layers 62, 66 can be made of a material that is suited to carry in-plane tensile loads that result from bending stresses imposed on the ring seal segment 50 during engine operation. For instance, the inner and outer layers 62, 66 can be made of ceramic matrix composite (CMC). In one embodiment, the inner and outer layers 62, 66 can be made of a hybrid oxide CMC material, an example of which is disclosed in U.S. Pat. No. 6,744,907, which is incorporated herein by reference. Alternatively, the inner and outer layers 62, 66 can be made of an oxide-oxide CMC, such as AN-720, which is available from COI Ceramics, Inc., San Diego, Calif. The inner and outer layers 62, 66 can be made of the same material, but, in some embodiments, the inner and outer layers 62, 66 can be made of different materials.

The CMC material of the inner and outer layers 62, 66 includes a ceramic matrix 72 and a plurality of fibers 74 within the matrix 72. The fibers 74 of the CMC can be oriented to provide the desired anisotropic strength characteristics. In one embodiment, a substantial portion of the fibers 74 at least in the extension 54 of the ring seal segment 50 can extend substantially parallel to the flow path 58 of the turbine. "Substantial portion" is intended to mean a sufficient majority of the fibers 74 so that the desired strength properties are obtained. In one embodiment, the fibers 74 can be oriented along the extension in the direction from the first transition region 94a to the second transition region 94b. However, the fibers 74 of the CMC can be arranged as needed in each of the inner and outer layers 62, 66. For instance, the fibers 74 can be arranged at substantially 90 degrees relative to each other, such as a 0-90 degree orientation or a ±45 degree orientation. The fibers 74 in the forward and aft spans 52, 56 can extend substantially parallel to each of those spans 52, 56, as shown in FIG. 2. The arrangement of the fibers 74 in the inner layer 62 can be substantially identical to the fiber arrangement in the outer layer 66, but the fiber arrangement in the inner and outer layers 62, 66 can be different.

The inner layer 62 can have an associated thickness $T_i$; the outer layer 66 can have an associated thickness $T_o$. In one embodiment, the thickness $T_i$ of the inner layer 62 can be substantially equal to the thickness $T_o$ of the outer layer 66. Alternatively, the thickness $T_i$ of the inner layer 62 can be unequal to the thickness $T_o$ of the outer layer 66. The thickness $T_c$ of the central layer 64 can be greater than the thickness $T_i$ of the inner layer 62 as well as the thickness $T_o$ of the outer layer $T_o$. The thickness $T_c$ of the central layer 64 can be proportional to the maximum expected shear load as well as the shear strength of the material. The thicknesses $T_i$, $T_o$ of the inner and outer layers 62, 66 can be proportional to the maximum expected bending tensile load as well as the tensile strength of the material of each layer 62, 66.

The inner layer 62 can have an outer surface 80 and a gas path surface 82. The gas path surface 82 can define a portion of the exterior of the ring seal segment 50. At least a portion of the gas path surface 82 can be coated with a thermal insulating material 84. For example, the thermal insulating material 84 can be applied to the portion of the inner layer 62 that forms the extension 54. In one embodiment, the thermal insulating material 84 can be FGI. The above discussion of FGI applies equally here.

The inner layer 62 can be attached to the inner surface 68 of the central layer 64 in any of a number of ways. In one embodiment, the central layer 64 can be formed by machining from a solid block of material. The inner layer 62 can be attached in a subsequent process. For example, the inner layer 62 can be built-up on the central layer 64 by a lay-up technique. During firing, the CMC inner layer 62 can shrink and compress onto the central layer 64.

Alternatively, the inner layer 62 and the central layer 64 can be separately formed. The inner layer 62 and the central layer 64 can then be bonded together using a bonding material, such as ceramic or glass adhesives. Yet another possibility is to form the inner layer 62 and then cast the central layer 64 into the shell of the inner layer 62. If needed, secondary processes can be performed to complete the central layer 64.

The outer layer 66 can have an inner surface 86 and an outer surface 88. The outer surface 88 of the outer layer 66 can define a portion of the exterior of the ring seal segment 50. The inner surface 86 of the outer layer 66 can be attached to the outer surface 70 of the central layer 64 in a variety of manners. For instance, the outer layer 66 and the central layer 64 can be separately formed and then bonded together with a bonding material, such as ceramic or glass adhesives. Alternatively, the outer layer 62 can be formed, and the central layer 64 can be subsequently cast onto the outer layer 62. The inner surface 68 of the central layer 64 can then be prepared for attachment to the inner layer 62, which can be done by any of the techniques described above.

In another construction, the inner and outer layers 62, 66 can be formed first, such as by lay-up. The inner and outer layers 62, 66 can be held in spaced relation to each other so as define a space therebetween. The spaced inner and outer layers 62, 66 can form at least in part a casting mold. Molten material of the central layer 64 can be poured into the space separating the inner and the outer layers 62, 66. The molten material can solidify to form the ring seal segment 50. Subsequent machining operations may be required to complete the ring seal segment 50.

The ring seal segment 50 according to aspects of the invention lends itself to the inclusion of various features. For example, the ring seal segment 50 can be adapted for attachment to one or more stationary support structures in the turbine section (not shown). In one embodiment, one or more passages 90 can extend through each of the forward and aft spans 52, 56. The passages 90 can be arranged in any suitable manner. Likewise, the passages 90 can have any suitable size, shape and orientation. Each passage 90 can receive a fastener (not shown) so as to connect the ring seal segment 50 to a turbine stationary support structure (not shown).

During engine operation, a coolant, such as air, can be supplied to the outer surface 88 of the ring seal segment 50. However, there is a potential for such coolant, which is at a relatively high pressure, to leak through the interface between adjacent circumferential ends of neighboring ring seal segments. The coolant can leak into the turbine gas path 58, which can adversely impact engine performance, among other things. Thus, the ring seal segment 50 can be adapted to facilitate sealing between adjacent ring seal segments 50.

Referring to FIG. 3, the ring seal segment 50 can provide one or more channels 96 in at least one of the circumferential ends 55, 57 of the ring seal segment 50. In one embodiment, the channel 96 can be provided entirely within the central layer 64. The channel 96 can be sized and shaped as needed. The channel 96 can generally follow along the contour of the ring seal segment 50. For instance, as shown in FIG. 3, the channel 96 can extend continuously from the forward span 52 to the aft span 56. Alternatively, the channel 96 can be provided in one or more local areas of the ring seal segment 50, such as just in the extension 54. The channel 96 can be formed in the ring seal segment 50 by any suitable process.

At least a portion of a seal 98 can be received in the channel 96. The seal 98 can extend along the entire channel 96 or just along one or more portions of the channel 96. Any suitable seal 98 can be used. The seal 98 can be made of any of a number of materials, including, for example, metal or CMC. The seal 98 can be a single continuous piece, or it can be made of a plurality of seal segments.

A portion of the seal 98 can extend beyond the circumferential ends 55, 57 of the ring seal segment 50. The extending portion of the seal 98 can be received in a corresponding channel in a neighboring ring seal segment (not shown). Thus, the seal 98 can operatively seal the interface between neighboring ring seal segments to minimize the leakage of coolant into the hot gas path 58.

During engine operation, the ring seal segment 50 can be subjected to a variety of loads. The ring seal segment 50 according to aspects of the invention is well suited to withstand the expected operational loads. The response of the ring seal segment 50 according to aspects of the invention to the operational loads can be similar to the response of an I-beam. Because they are located away from the neutral axis 92 of the ring seal segment 50, the inner and outer layers 62, 66 can carry the maximum tensile loads of the bending stress distribution. As noted above, the fibers 74 of the CMC can be arranged so that the tensile loads act in the in-plane direction of the inner and outer layers 62, 66, which is the direction in which the CMC inner and outer layers 62, 66 are the strongest.

The central layer 64 can stiffen the ring seal segment 50 and can carry most of the shear load due to the differential pressure load across the ring seal segment 50. The maximum shear load occurs at the neutral axis 92, and the smallest shear load occurs at the inner and outer layers 62, 66. The central layer 64 can provide stability to the ring seal segment 50, so that there is little or no bending at a transition region 94 between the extension 54 and each of the forward and aft spans 52, 56. Thus, loading of the inner and outer CMC layers 62, 66 in their weakest strength direction (i.e., the through thickness direction) can be minimized.

The foregoing description is provided in the context of one possible multi-layer ring seal segment for use in a turbine engine. While the foregoing example is directed to a ring seal segment with three layers, aspects of the invention are not limited to a three-layer ring seal segment. A ring seal segment according to aspects of the invention can be made of two layers or more than three layers. Further, while the above discussion concerns a ring seal segment, the multi-layer construction described herein has equal application to a full 360 degree ring seal body. Thus, it will of course be understood that the invention is not limited to the specific details described herein, which are given by way of example only, and that various modifications and alterations are possible within the scope of the invention as defined in the following claims.

What is claimed is:

1. A turbine engine ring seal comprising:
   a ring seal body having a radially inwardly concave surface, the ring seal body being shaped so as to form an extension transitioning in a first region into a forward span and in a second region into an aft span, the first and second spans being opposite each other and extending at an angle from the extension in a radially outward direction,
   the ring seal body having a first layer and a second layer, the first layer being made of a ceramic matrix composite, the second layer being made of a non-ceramic matrix composite material, the second layer having an inner surface and an outer surface, wherein the first layer is attached to one of the inner surface and the outer surface of the second layer, and further including a third layer made of a ceramic matrix composite, wherein the third layer is attached to the other one of the inner surface and the outer surface of the second layer.

2. The ring seal of claim 1 wherein the third layer is made of a different ceramic matrix composite than the first layer.

3. The ring seal of claim 1 wherein the first layer is made of a hybrid oxide ceramic matrix composite.

4. The ring seal of claim 1 wherein the first layer is made of an oxide-oxide ceramic matrix composite.

5. The ring seal of claim 1 wherein the second layer is made of one of a strain tolerant aggregate material, friable graded insulation, and a monolithic ceramic.

6. The ring seal of claim 1 wherein the ring seal body includes a first circumferential end and a second circumferential end, wherein at least one of the first and second circumferential ends includes a channel therein, and further including a seal, wherein at least a portion of the seal is received within the channel.

7. The ring seal of claim 1 wherein the ceramic matrix composite first layer includes a ceramic matrix with a plurality of fibers therein, wherein a substantial portion of the fibers at least in the extension are oriented so as to extend along the first layer in a direction from the first region to the second region.

8. The ring seal of claim 1 wherein the first layer has an associated first thickness and the second layer has an associated second thickness, wherein the second thickness is greater than the first thickness.

9. A turbine engine ring seal comprising:
   a ring seal body having a radially inwardly concave surface, the ring seal body being shaped so as to form an extension transitioning in a first region into a forward span and in a second region into an aft span, the first and second spans being opposite each other and extending at an angle from the extension in a radially outward direction,
   the ring seal body having a first layer and a second layer, the first layer being made of a ceramic matrix composite, the second layer being made of a non-ceramic matrix composite material, the second layer having an inner surface and an outer surface, wherein the first layer is attached to one of the inner surface and the outer surface of the second layer, the first layer having an outer surface and an inner surface, wherein the outer surface of the first layer is attached to the second layer, and wherein at least a portion of the inner surface of the first layer is coated with a thermal insulating material.

10. A turbine engine ring seal comprising:
    a ring seal body having a radially inwardly concave surface, the ring seal body being shaped so as to form an extension transitioning in a first region into a forward span and in a second region into an aft span, the first and second spans being opposite each other and extending at an angle from the extension in a radially outward direction,
    the ring seal body having an inner layer, a central layer and an outer layer, the inner layer being made of a first ceramic matrix composite, the outer layer being made of a second ceramic matrix composite, the central layer being made of a material that is different from each of the first and second ceramic matrix composites,
    the central layer having an inner surface and an outer surface, the inner layer being attached to the inner surface of the central layer, the outer layer being attached to the outer surface of the central layer.

11. The ring seal of claim 10 wherein the first ceramic matrix composite is the same as the second ceramic matrix composite.

12. The ring seal of claim 10 wherein the first ceramic matrix composite and the second ceramic matrix composite are different.

13. The ring seal of claim 10 wherein at least one of the inner layer and the outer layer is made of a hybrid oxide ceramic matrix composite.

14. The ring seal of claim 10 wherein at least one of the inner layer and the outer layer is made of an oxide-oxide ceramic matrix composite.

15. The ring seal of claim 10 wherein the central layer is made of one of a strain tolerant aggregate material, friable graded insulation, and a monolithic ceramic.

16. The ring seal of claim 10 at least a portion of the inner layer is coated with a thermal insulating material.

17. The ring seal of claim 10 wherein the ring seal body includes a first circumferential end and a second circumferential end, wherein at least one of the first and second circumferential ends includes a channel therein, and further including a seal, wherein at least a portion of the seal is received within the channel.

18. The ring seal of claim 10 wherein the central layer has an associated thickness and each of the inner and outer layers has an associated thickness, wherein the thickness of the central layer is greater than the thickness of the inner layer and the thickness of the outer layer.

19. The ring seal of claim 10 wherein the ceramic matrix composite inner layer includes a ceramic matrix with a first plurality of fibers therein and the ceramic matrix composite outer layer includes a ceramic matrix with a second plurality of fibers therein, wherein a substantial portion of the fibers in each of the first and second plurality of fibers at least in the extension are oriented so as to extend along the inner and outer layers in a direction from the first region to the second region.

* * * * *